United States Patent [19]

Roberts

[11] Patent Number: 5,434,496
[45] Date of Patent: Jul. 18, 1995

[54] A.C. INDUCTION DEVICES HAVING COMPOUND RESISTIVE COUPLING OF TUNED REFLUX WINDING TO NEUTRAL OR ELECTRICAL GROUND

[75] Inventor: Gary D. Roberts, Riverton, Utah
[73] Assignee: RemTech Co., Lindon, Utah
[21] Appl. No.: 162,602
[22] Filed: Dec. 7, 1993

Related U.S. Application Data

[63] Continuation-in-part of Ser. No. 917,227, Jul. 23, 1992.
[51] Int. Cl.$^6$ .................................................. G05F 1/24
[52] U.S. Cl. ....................................... 323/208; 323/205
[58] Field of Search ............................. 323/205–209, 323/214, 355, 356

[56] References Cited

U.S. PATENT DOCUMENTS

| | | | |
|---|---|---|---|
| 3,895,275 | 7/1975 | Rostad | 318/227 |
| 4,473,817 | 9/1984 | Perkins | 340/310 R |
| 4,672,298 | 6/1987 | Rohatyn | 323/208 |
| 5,105,327 | 4/1992 | Wohlforth | 361/56 |

*Primary Examiner*—Thomas M. Dougherty
*Assistant Examiner*—Adolf Berhane
*Attorney, Agent, or Firm*—Robert B. Crouch

[57] ABSTRACT

Single and polyphase a.c. induction devices, such as: motors, generators, transformers, welders, ballasts, etc. are so wound as to maximize performance and efficiency. For each phase of such device this invention utilizes a combined pair of windings which are conductively and inductively dependent. An energy supply winding of each combined pair is electrically connected to a corresponding input/output phase, while the remaining, or reflux, winding of each pair is electrically connected in series with a tunable capacitive element and to neutral or electrical ground by means of a linear and non-linear resistive means. The energy and reflux windings of each combined pair are positioned within the device in tight-to-critically coupled transformer relationship with a third inductive input/output component and the capacitive reactance adjusted to reduce to a minimum the net reactive factor of the coupled inductive elements and the net reflected impedance of the input/output circuitry, thus facilitating maximum energy transfer and efficiency.

10 Claims, 1 Drawing Sheet

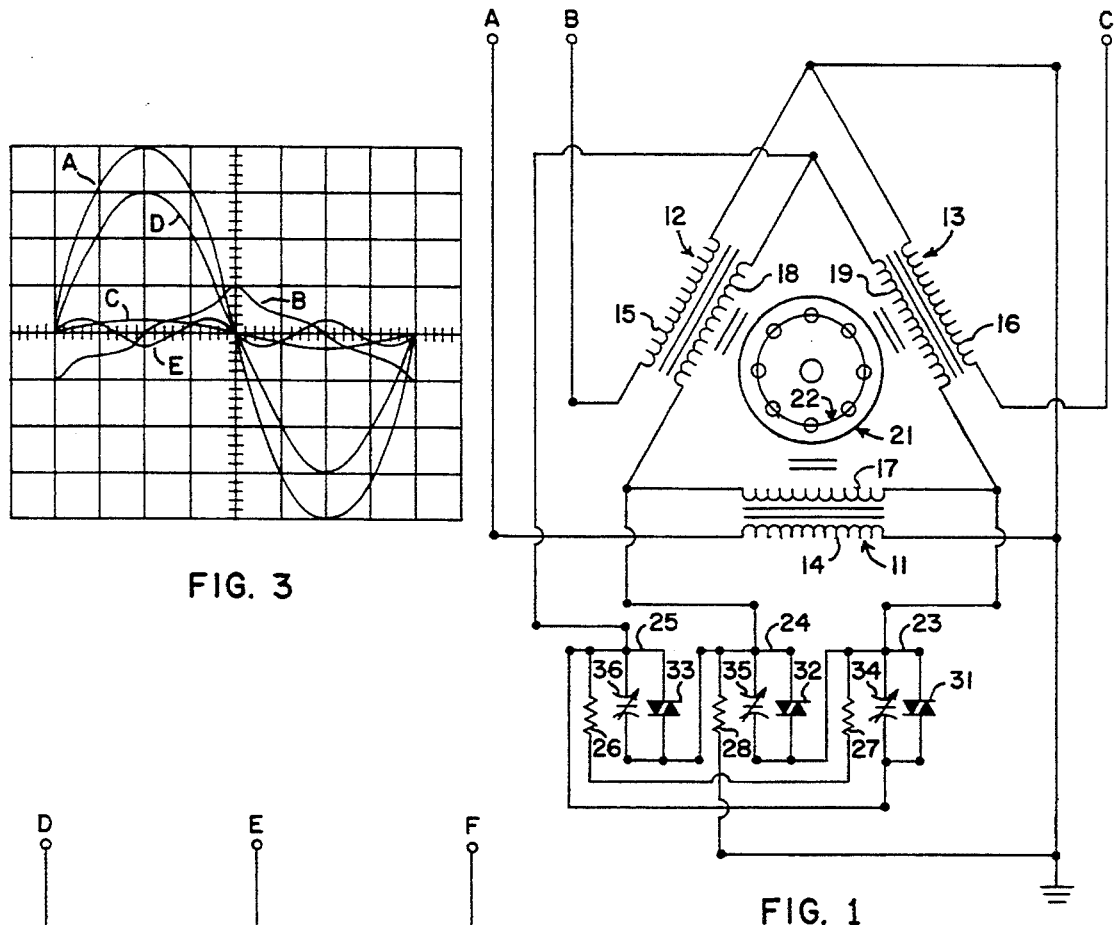
FIG. 3
FIG. 1
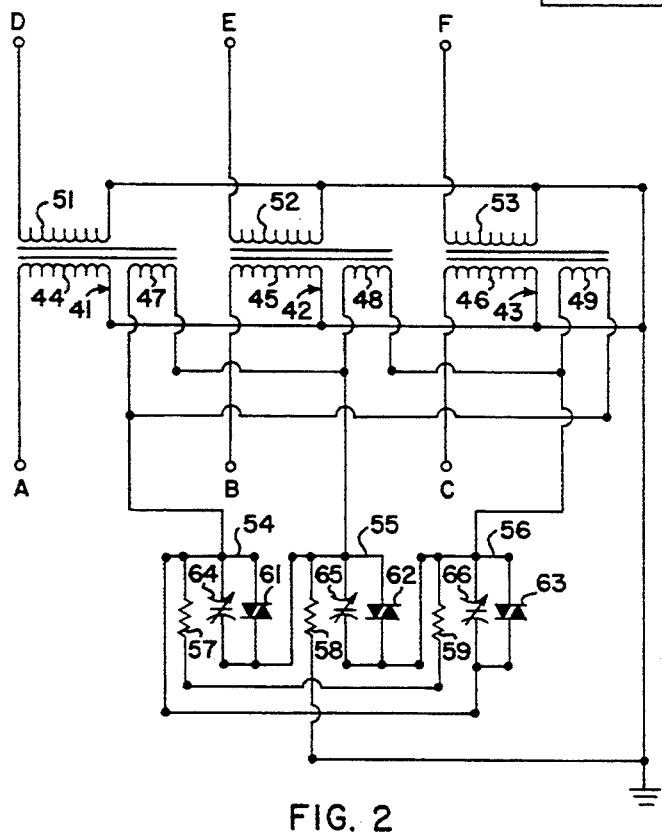
FIG. 2

A.C. INDUCTION DEVICES HAVING COMPOUND RESISTIVE COUPLING OF TUNED REFLUX WINDING TO NEUTRAL OR ELECTRICAL GROUND

This application is a continuation-in-part of U.S. patent application Ser. No. 917,227, filed Jul. 23, 1992.

BACKGROUND OF THE INVENTION

The increasing demand for alternating current power and the effect the generation of such power has on the ecosystem, has provided impetus to conserve power and improve efficiency of power usage. Since over 75% of the total electrical energy produced is used to operate induction equipment of one type or another, the efficiency and reactive factor of such devices become logical areas for improvement. A need has thus arisen for development of a better configuration for induction devices which addresses changes necessary to improve device efficiency and reduce the kva demand on the alternating current systems.

A high kva demand adversely affects the operation of an alternating current system in three fundamental ways. First, generators, transformers and electrical distribution equipment are rated or sized in terms of kva rather than kilowatts, since their losses and heating are largely determined by voltage and current regardless of power factor, and their physical size and cost are roughly proportional to their kva rating. Second, high kva means high current flowing in the system which results in increased copper losses in the generating and transmission equipment. Finally, with a high component system, voltages are difficult to regulate, resulting in a net reduction of system and component efficiency.

The significance of reducing kva demand has been recognized since the introduction of the first induction device and emphasis has been placed on development of methods to curtail the inherent kva problem. The importance of this problem has continued to escalate with increasing demand for induction type equipment as evidenced by the extensive prior art activity on the subject. For the most part, however, the prior art does not address the basic issue, since it has not taken into account the internal workings of the induction device itself.

SUMMARY OF THE INVENTION

This invention avoids the shortcomings of the prior art approaches by providing means to substantially reduce the kva of an entire alternating current system, from the generative source to the final end use. It does so by providing a means for maintaining, on an individual basis, the essential excitation current of each electromagnetic induction device used within the system. It also introduces a preferably-critically coupled, tuned winding arrangement to reduce exciting current, leakage reactance, and core and copper losses for each induction device in the system, thereby safeguarding overall system and unit efficiency.

The present invention is applicable to any alternating current electromagnetic induction device which is used to change voltage or current levels or to transfer energy between mechanical and electrical systems. In such an alternating current induction device, a combined pair of windings which are critically-coupled in transformer relation is provided for each phase and is positioned in tight-to-critically coupled transformer relation with a third winding for each phase. One winding of each combined pair is connected to an input/output phase, while the remaining winding of each pair is electrically connected in series with a variable capacitive reactance and to neutral or electrical ground through a linear and non-linear resistor circuit. The capacitive reactance is then adjusted to minimize the net reactive factor of the coupled windings and the net reflected impedance of the input/output circuitry.

DRAWING

The best mode presently contemplated of carrying out the invention will be understood from the detailed description of the preferred embodiments illustrated in the accompanying drawing in which:

FIG. 1 is a circuit diagram of the present invention as applied to an alternating current motor or generator, and FIG. 2 is a circuit diagram of the present invention as applied to an alternating current transformer, and FIG. 3 is an oscilloscope trace showing the applied voltage, no-load current and exciting current of a standard transformer in comparison with the working load current and exciting current of a transformer employing the present invention.

DETAILED DESCRIPTION

Referring more specifically to the drawing, FIG. 1 is a diagrammatic representation of the present invention embodied in a three phase, alternating current motor. As illustrated, three-combined pairs of windings 11, 12, 13 are fixed in place within a circular stator (not shown) to provide the stator windings of a three phase motor. Each combined pair includes a first winding 14, 15, 16 and a second, or reflux, winding 17, 18, 19 which are positioned to have a critical coefficient of coupling between them. In practice, the first and second windings are located immediately adjacent each other in common slots in the stator with the minimum possible insulated space between them. The first winding of each combined pair is connected to a contact of a three phase power supply, for example, winding 14 to terminal A, winding 15 to terminal B, and winding 16 to terminal C. A rotor 21 carrying rotor windings 22 is mounted for rotation within the stator with a tight coefficient of coupling between the the rotor windings 22 and the windings of each combined pair. A critical coefficient of coupling would be desireable, but due to the stack up of mechanical tolerances in the mounting of the rotor, a tight coefficient of coupling is the best that is presently obtainable. The second, or reflux, winding of each combined pair is connected to neutral or electrical ground through a series-connected RC circuit 23, 24, 25 and a linear resistor 26, 27, 28. Each RC circuit includes a tunable capacitive element 34, 35, 36 which is connected in parallel with a non-linear resistor 31, 32, 33, such as a metal oxide semi-conductor or varistor. The tunable capacitive element can be a variable transformer, a saturable reactor, or manual or electronic means of varying the applied voltage to the capacitive element.

In considering the operation of the present invention, reference is made to the combined pair 11 and its associated circuitry 23, 26, 31, 34 and terminal A as representing a single phase motor. Energy supplied from terminal A is transmitted inductively from winding 14 through reflux winding 17 to the rotor windings 22, thereby creating a rotating magnetic field which exerts torque on the rotor. By adjustment of the capacitive element 34, the combined pair of windings 11 is polarized and tuned to net an impedance on the reflux winding 17 which is significantly capacitive. This capacitive impedance is reflected to the first and third (rotor) windings. This produces the effect of a capacitor in series with the third winding without the possibility of a resonance failure. In addition, the reflected capacitive reactance, when divided by the net mutual inductive reactance obtained by its topological coupling with the first and third windings, results in a net reflected impedance that is inductive as viewed by the supply. Since the impedances of the first and third windings are thereby matched, this condition will allow energy to flow freely between them with a reduction of the transformation leakage reactance, excitation current and other known loss mechanisms normally associated with an induction motor. In addition, the surge impedance of the device is altered such that the instantaneous voltage appearing at the terminal A is both limited and controlled. The voltage surge wave energy is absorbed by the capacitive element and distributed across the entire winding, rather than being absorbed by the first few turns in the winding as is prevalent in prior art devices. The maximum instantaneous voltage is also held at a safe level by the clipping action of the RC circuit. The linear resistor 26 also bleeds off electro-static potential which exists between the first and reflux windings. The size or value of the resistor 26 is selected to be large enough to bleed off the electro,static potential of the capacitive reactance between the windings without appreciable energy loss. The operation of the combined pair 11 and associated circuitry is similar when the number of combined pairs is increased in a polyphase induction device, such as the three phase motor illustrated.

The present invention, as described in connection with FIG. 1, provides an induction device which can function as a high efficiency motor or can be driven by a mechanical power source to function as a generator. In this latter mode, improved energy transfer across the air gap from the rotor to the stator is achieved with the reflux windings and resultant LRC tank circuit. The inherent high power factor of the device allows for a higher air gap voltage to be developed which results in improved efficiency and will yield an increase in KW output of 12-15% over that of a comparable size standard induction motor when driven as a generator. A further advantage of the present invention as a generator is that it will produce a more sinusoidal output voltage and more efficient voltage regulation by the controlled tuning of its integrally wound circuitry. In addition, through auto-controlled self-excitation, the present invention provides efficient operation as an independent, stand alone induction generator with good voltage regulation.

In FIG. 2 of the drawing, the present invention is illustrated as embodied in a three phase alternating current transformer. Three combined pairs of windings 41, 42, 43 include first windings 44, 45, 46 in critically coupled relation with reflux windings 47, 48, 49. Each combined pair is positioned in critically coupled relation with a third winding 51, 52, 53. Unlike the motor and generator application of FIG. 1, a critical coefficient of coupling between each combined pair and the associated third winding is practical, since they are wound on common cores and there is no relative movement between them. In the device illustrated, windings 44, 45 46 are each connected to a contact A, B, C, respectively, of a three phase power supply, while windings 51, 52, 53 are each connected to a contact D, E, F, respectively, on the output side of the device. Similar to the motor and generator, the reflux winding of each combined pair is connected to neutral or electrical ground through a series-connected RC circuit 54, 55, 56 and a linear resistor 57, 58, 59. Each RC circuit includes a non-linear resistor 61, 62, 63 connected in parallel with a tunable capacitive element 64, 65, 66. The non-linear resistors and capacitive elements are similar to 31-33 and 34-36, respectively.

The operation of the present invention in the transformer of FIG. 2 is similar to that of the motor and generator application, in that, by adjustment of the capacitive elements 64, 65, 66, the windings of each combined pair 41, 42, 43 are polarized and tuned to net a significantly capacitive impedance on the reflux windings 47, 48, 49 which is reflected to the first (44, 45, 46) and third (51, 52, 53) windings. The reflected capacitive reactance, when divided by the net mutual inductive reactance obtained by its topological coupling with the first and third windings, results in a net reflected impedance that is inductive as viewed by the power supply. The impedances of the first and third windings are thereby matched, thus allowing energy to flow freely between them with a reduction in transformation leakage reactance, etc. In addition, the surge impedance of the device is altered such that the instantaneous voltage appearing at the contacts A, B, C is both limited and controlled in the manner discussed in connection with the motor and generator application.

As shown in FIG. 3, the applied voltage in a typical prior art alternating current transformer follows a well defined sine wave A, while the no-load current B is 90° out of phase and is distorted by higher order harmonics, and the exciting current C follows a very shallow sine wave. By comparison, for a transformer embodying the present invention, the working load current follows a sine wave D, while the exciting current follows a shallow double-lobed sine wave E.

Considering the energy transfer capability of the transformer of FIG. 2 and FIG. 3, D,E, and the effect that tuning of the second (reflux) winding circuit has, it should be understood that the total impedance of the device is equal to the coefficient of coupling of all of the windings, i.e., (first winding impedance+second winding impedance+third winding impedance). When properly tuned, the net reactance of the second winding is capacitive. This reactance is reflected through mutual coupling to both the first winding and the third winding to, in effect, cancel their inductive reactances and leave only their ohmic resistances to resist the energy transfer from the first to the third windings. Since the mutual inductance of the coupled circuits remains essentially constant at power supply frequency, as the total impedance decreases to a minimum the coupled impedance increases to a maximum, allowing maximum energy transfer. Dividing the capacitive impedance of the second winding with its coupled first and third winding impedances results in an inductive coupled impedance. Therefore, as far as the power supply is concerned, the third winding behaves as though it were a parallel RC circuit in series with the first winding and the impedance of the first winding tends to decrease to a minimum to allow maximum first winding current flow. At the same time, the total coupled impedance tends to increase the impedance of the first winding, thus limiting or controlling its current. The extent to which the tuned second winding circuit affects the transfer of energy between the first and third windings depends upon the degree of coupling between them, since maximum transfer of energy will occur only when the load resistance is equal to the resistance of the source. With the magnetically coupled tuned circuits of the present invention, maximum energy transfer takes place when the coupled resistances are equal to the first winding resistance. Since the coupled resistance depends upon the mutual inductance, which in turn depends upon the coefficient of coupling, there must be tight-to-critical coupling between the windings for maximum energy transfer between the first and third windings to occur.

With critical coupling, the third winding current attains its greatest value. However, since the coupled impedance tends to rise when tuned, the first winding current is no longer maximum. This phenomena tends to cause a slight double-lobed trace of near equal magnitude in the exciting current at, no load, since the coupled impedance tries to limit or control supply current. However, since it is not possible to achieve critical coupling when in combination with a moving element, the characteristic curve appears more like a sine wave with a flattened peak rather than a double-lobed trace. At this point, the device has the lowest net reactive factor and, therefore, minimum current. In practice it is desireable to tune the second winding circuit so as to have a coefficient of coupling approximately 10-15% less than that achieved when the double-lobed or flattened wave form occurs. This provides a trace wherein the double lobes or flattened sine wave inclines slightly upward to the right. At this point the device is operating at maximum efficiency. This point can be determined by measurement of the value of the capacitance supplied by the tunable capacitive elements 34-36 or 64-66 when minimum source current is achieved and then resetting the capacitive elements to approximately 85% of that value. This can be done manually or automatically, depending upon the particular application.

Since the present invention is applicable to any alternating current induction device, significant savings through energy reduction can be achieved in an overall system be incorporating the teachings of the present invention into all of the induction devices used within the system, i.e., generators, transformers, motors, etc. An additional advantage derived from use of the present invention lies in its ability to cancel higher order harmonics. In a three phase induction device, when a wye connection is employed at the input, any higher order harmonics produced externally of the device will be cancelled by a delta connection of the reflux windings. Similarly, higher order harmonics produced internally of the device will be cancelled by the low impedance of the capacitive elements.

While the invention has been described with reference to specifically illustrated preferred embodiments, it should be realized that various changes may be made without departing from the disclosed inventive subject matter particularly pointed out and claimed herebelow.

I claim:

1. An alternating current induction device wherein energy is transferred inductively between windings, which includes:
    a combined pair of windings including a first winding connected to a power supply terminal and a second winding connected to electrical ground, said first and second windings being in critically-coupled transformer relation,
    a third winding in tight-to-critical coupled transformer relation with the combined pair whereby energy is transmitted inductively between the first winding and the third winging through the second winding, and
    means connected to the second winding for reducing to a minimum the net reactive factor of the coupled first and third windings thereby facilitating maximum energy transfer between the first and the third winding.

2. An alternating current induction device as set forth in claim 1 in which said means includes an adjustable means for polarizing and tuning said second winding to exhibit a capacitive reactance which is reflected to cancel the inductive reactances of the first and third windings.

3. An alternating current induction device as set forth in claim 2 in which said means includes an RC circuit connected in series with said second winding, said RC circuit including a non-linear resistor and a capacitor connected in parallel, and means for varying the capacitive reactance thereof.

4. An alternating current induction device as set forth in claim 3 in which a linear resistor is connected in series between the RC circuit and electrical ground to bleed off the electro-static potential between the combined pair of windings.

5. An alternating current induction device as set forth in claim 4 which is a motor/generator in which the first and second windings are positioned in common slots in a stator and the third winding is positioned in a rotor mounted for movement relative to the combined pair.

6. An alternating current induction device as set forth in claim 2 in which said means produces the effect of a capacitor in series with the coupled windings without the possibility of a resonance failure.

7. A polyphase alternating current induction device wherein energy is transferred inductively between windings, which includes:
    a combined pair of windings for each phase, each pair including a first winding connected to a power supply terminal and a second winding connected to electrical ground, said first and second windings being in critically-coupled transformer relation,
    a third winding for each phase in tight-to-critically coupled relation with each combined pair whereby energy is transmitted inductively between each said first winding and the associated third winding through the associated second winding, and
    separate means connected to each said second winding for reducing to a minimum the net reactive factor of the coupled windings thereby facilitating maximum energy transfer between each said first winding and the associated third winding.

8. A polyphase alternating current induction device as set forth in claim 7 in which each said means includes an adjustable means for polarizing and tuning each said second winding to exhibit a capacitive reactance which is reflected to cancel the inductive reactances of the associated first and third windings.

9. A polyphase alternating current induction device as set forth in claim 8 which is a motor/generator in which each said first and second windings are are positioned in common slots in a stator and the third windings are positioned in a rotor mounted for movement relative to the combined pair.

10. A polyphase alternating current induction device as set forth in claim 7 in which said means produces the effect of a capacitor in series with the coupled windings without the possibility of a resonance failure.

* * * * *